US007934373B2

(12) United States Patent
Chiba et al.

(10) Patent No.: US 7,934,373 B2
(45) Date of Patent: May 3, 2011

(54) CONTROL DEVICE FOR AN INTERNAL COMBUSTION ENGINE OF A VEHICLE

(75) Inventors: Isao Chiba, Wako (JP); Hiroto Takeuchi, Wako (JP)

(73) Assignee: Honda Motor Co. Ltd., Tokyo (JP)

(*) Notice: Subject to any disclaimer, the term of this patent is extended or adjusted under 35 U.S.C. 154(b) by 927 days.

(21) Appl. No.: 11/882,197

(22) Filed: Jul. 31, 2007

(65) Prior Publication Data

US 2008/0034736 A1 Feb. 14, 2008

(30) Foreign Application Priority Data

Aug. 8, 2006 (JP) ................................ 2006-216021

(51) Int. Cl.

| | |
|---|---|
| ***F01N 3/00*** | (2006.01) |
| ***B01D 46/00*** | (2006.01) |
| ***G01M 17/00*** | (2006.01) |
| ***G06F 7/00*** | (2006.01) |
| ***G06F 19/00*** | (2006.01) |
| ***G06G 7/70*** | (2006.01) |
| ***G06G 7/76*** | (2006.01) |
| ***G08G 1/00*** | (2006.01) |

(52) U.S. Cl. ................ 60/295; 60/297; 95/278; 701/30; 701/117; 701/118; 701/119

(58) Field of Classification Search .................... 60/273, 60/295, 297, 274; 95/273, 278, 279, 283; 701/29, 30, 101–103, 110, 114–115, 117–119

See application file for complete search history.

(56) References Cited

U.S. PATENT DOCUMENTS

| | | | | |
|---|---|---|---|---|
| 5,050,376 | A * | 9/1991 | Stiglic et al. | 60/274 |
| 6,951,100 | B2 * | 10/2005 | Kuboshima et al. | 60/311 |
| 7,200,991 | B2 * | 4/2007 | Otake et al. | 60/311 |
| 2007/0125074 | A1 * | 6/2007 | Marquardt | 60/295 |

FOREIGN PATENT DOCUMENTS

| | | | |
|---|---|---|---|
| EP | 1 195 508 | A2 | 4/2002 |
| EP | 1 439 294 | A2 | 7/2004 |
| EP | 1 519 020 | A2 | 3/2005 |
| EP | 1 582 721 | A2 | 10/2005 |
| JP | 2000-161044 | A | 6/2000 |
| JP | 2003314250 | A * | 11/2003 |
| JP | 2004-132223 | A | 4/2004 |
| JP | 2005248762 | A * | 9/2005 |

OTHER PUBLICATIONS

Nishimura, English abstract of JP 2005-248762 A, Sep. 15, 2005.*
Tsutsumoto, English abstract of 2003-314250 A, Nov. 6, 2003.*

* cited by examiner

*Primary Examiner* — Thomas E Denion
*Assistant Examiner* — Audrey Klasterka
(74) *Attorney, Agent, or Firm* — Arent Fox LLP

(57) ABSTRACT

In a control device for an internal combustion engine (E) of a vehicle comprising a particulate filter (42) installed in an exhaust passage of the engine and a loading device (63) that applies a load to the engine, the control device (9) is configured to execute a regeneration process for regenerating the particulate filter under a prescribed condition. When a vehicle is in a congested state, the temperature of the particulate filter typically drops below a threshold level for enabling a regenerating process. However, according to the present invention, the particulate filter may be regenerated even when the vehicle is in a congested state if a loading device such as an air conditioner is activated, and the temperature of the particulate filter is therefore high enough. Thereby, the particulate filter may be actively regenerated whenever possible.

15 Claims, 4 Drawing Sheets

CONTROL DEVICE FOR AN INTERNAL COMBUSTION ENGINE OF A VEHICLE

CROSS-REFERENCE TO RELATED APPLICATION

This application claims the priority of Japanese Application No. 2006-216021, filed Aug. 8, 2006, the entire specification, claims and drawings of which are incorporated herewith by reference.

TECHNICAL FIELD

The present invention relates to a control device for an internal combustion engine of a vehicle, and in particular to a technology that allows a particulate filter to be favorably regenerated.

BACKGROUND OF THE INVENTION

A diesel engine emits a substantial amount of diesel emitted particulates (DEP) along with normal exhaust gas owing to incomplete combustion of fuel in diffusion combustion stage and delayed combustion stage. Therefore, a vehicle powered by a diesel engine is increasingly more often fitted with a diesel particulate filter (DPF) in an exhaust passage thereof to capture the EDP contained in the exhaust gas. As a practical DPF is known a wall flow type DPF which includes a cylindrical honeycomb structure made of porous ceramic material and having passages blocked in an alternating manner so that the exhaust gas may pass through the thin walls of the honeycomb structure and DEP may be captured in the process.

In such a diesel engine, because the DPF becomes progressively blocked up owing to the accumulation of the captured DEP, it is necessary to regenerate the DEP by combustion/removal. If an oxide catalytic converter is provided upstream of the DPF or the DPF is incorporated with an oxide catalyst, a regenerating operation is carried out typically by conducting a post fuel injection so that the unburned fuel is oxidized in the oxide catalyst and the resulting reaction heat may increase the temperature of the exhaust gas above the combustion temperature (600° C., for instance) of the DEP.

To efficiently carryout the regeneration of a DPF, it is essential to take into account the operating condition of the engine. It was therefore proposed to determine the operating condition of the engine from the amount of fuel injection and engine rotational speed and carry out a regenerating process only under a prescribed operating condition (see Japanese patent laid open publication Number 2001-161044). Japanese patent laid open publication Number 2001-161044 also discloses to continue the regenerating process even when the engine operating condition deviates from the desirable operating range as long as the DPF temperature is above a prescribed level. It was also proposed to determine the operating condition of the vehicle according to an output of a vehicle speed sensor and prohibit the regenerating process in a vehicle congestion (see Japanese patent laid open publication Number 2000-132223). The exhaust gas temperature drops in a congested road so that the post fuel injection is required to be increased to raise the temperature of the DPF. Furthermore, even when a post fuel injection is carried out, it may not be possible to raise the temperature of the DPF to the combustion temperature of the DEP, and this leads to a fuel waste.

However, the method of Japanese patent laid open publication Number 2001-161044 relies on the temperature of the DPF in determining if the regenerating operation may be continued, it is difficult to detect the changes in the temperature of the exhaust gas. In other words, because the regeneration of the DPF occurs only after the temperature of the exhaust gas has reached the combustion temperature of the DEP, it is inevitable to have a delay in determining whether the regenerating operation should be continued in relation to the changes in the temperature of the exhaust gas. Also, because a oxide catalytic converter is provided upstream of the DPF, it is not possible to account for the activity level of the oxide catalyst when determining the temperature of the DPF.

According to the method of Japanese patent laid open publication Number 2000-132223, because the regenerating operation is unconditionally suspended in a congested road condition, even when the exhaust gas temperature rises owing to the activation of a loading device (such as a compressor of an air conditioner), the frequency of regenerating the DPF becomes undesirably low particularly when the vehicle is traveling in a rural area so that the resulting pressure loss of the exhaust gas may cause a reduction in the engine output. Also, because the congested state of the road is determined solely from an output of a vehicle speed sensor, depending on the selection of the threshold level, some of the typical operating modes of the vehicle in a congested state such as traveling at a relatively high speed in a low gear may not be properly accounted for.

BRIEF SUMMARY OF THE INVENTION

In view of such problems of the prior art, a primary object of the present invention is to provide a control device for an internal combustion engine of a vehicle that allows a favorable regeneration of a particulate filter.

A second object of the present invention is to provide a method for controlling an internal combustion engine of a vehicle that allows a favorable regeneration of a particulate filter.

To achieve such an object, the present invention provides a control device for an internal combustion engine of a vehicle comprising a particulate filter installed in an exhaust passage of the engine and a loading device that applies a load to the engine, the control device being configured to execute a regeneration process for regenerating the particulate filter under a prescribed condition, the control device comprising: a congestion detecting unit for detecting a congested state according to a traveling speed of the vehicle; a load detector for detecting a load applied to the engine by a loading device; and a control unit for setting a congestion threshold value, the control unit suspending a regeneration process when a congested state is detected by the congestion detecting unit; wherein the control unit lowers the congestion threshold value when a load is applied to the engine by the loading device. The present invention also provides a control method for an internal combustion engine of a vehicle comprising a particulate filter installed in an exhaust passage of the engine, a loading device that applies a load to the engine and a control device for controlling the engine, the control device being configured to execute a regeneration process for regenerating the particulate filter under a prescribed condition, the control method comprising: detecting a congested state according to a traveling speed of the vehicle; detecting a load applied to the engine by a loading device; setting a congestion threshold value; suspending a regeneration process when a congested state is detected; and lowering the congestion threshold value when a load is applied to the engine by the loading device.

Thus, when a loading device is activated and the exhaust gas temperature is high, the regeneration operation is continued even when the vehicle speed is relatively low and the DPF is thereby more actively regenerated.

The loading device may comprise an air conditioner. The congestion threshold value can be most conveniently given as a vehicle speed threshold. If the vehicle speed threshold is varied depending on a shift position of a transmission system of the vehicle, typical operating modes of the vehicle in a congested state such as traveling at a relatively high speed in a low gear can be accurately accounted for.

According to a preferred embodiment of the present invention, the vehicle is provided with a temperature sensor for detecting a temperature of the particulate filter, and the control unit continues the regeneration process even when a congested state is detected if a detected temperature is higher than a prescribed value. Thereby, the regeneration operation of the engine is carried out whenever possible. However, if the temperature of the particulate filter cannot be raised to the combustion temperature of the particulate matter such as diesel emitted particulate matter even with a post injection or other measures, the regeneration operation is suspended and unnecessary consumption of fuel can be avoided.

BRIEF DESCRIPTION OF THE DRAWINGS

Now the present invention is described in the following with reference to the appended drawings, in which.

DETAILED DESCRIPTION OF THE PREFERRED EMBODIMENTS

<<Structure of the Embodiment>>

Figure 1:
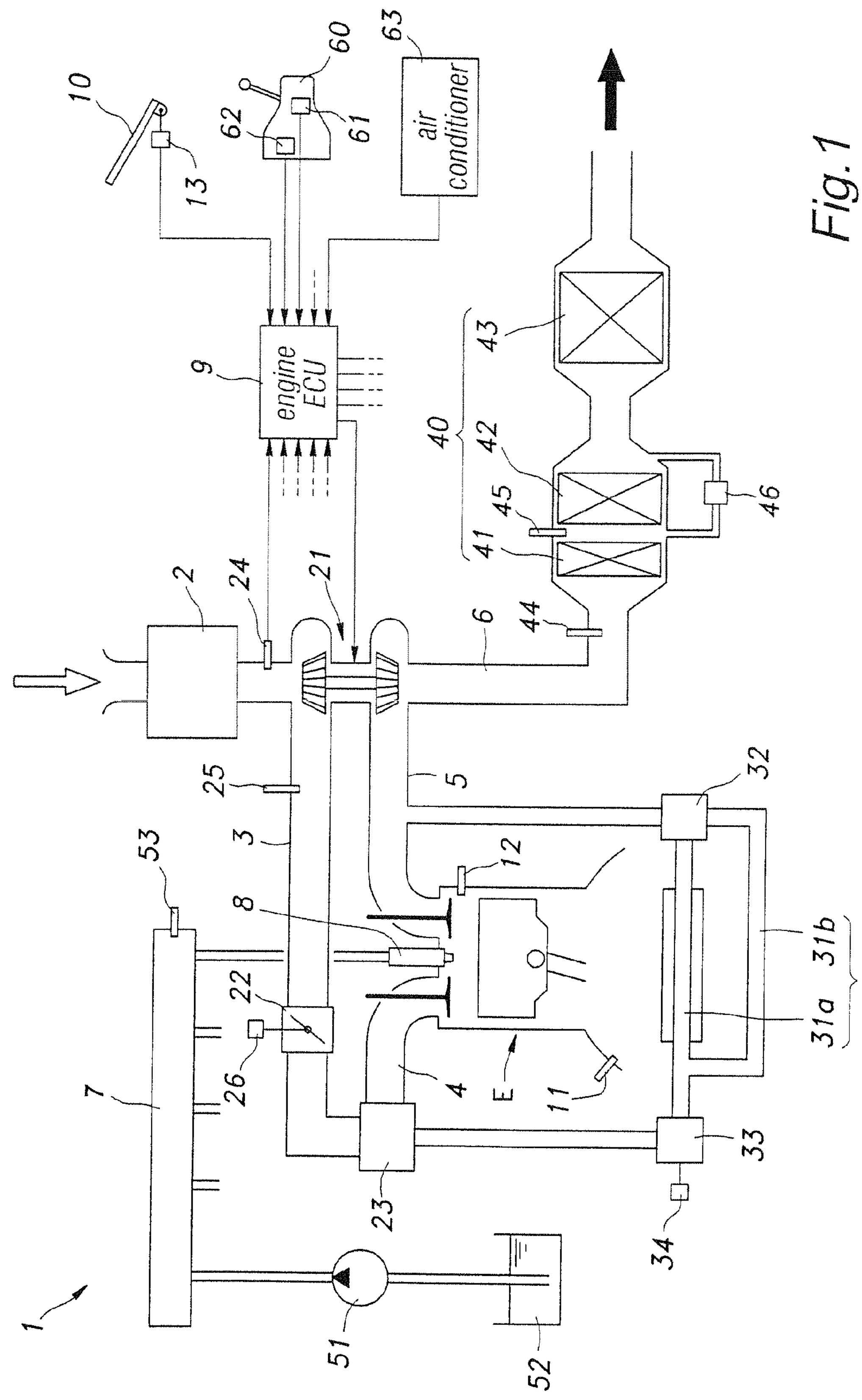
FIG. 1 is an overall structural view of a diesel engine to which the present invention is applied.

Referring to FIG. 1, the engine system 1 comprises a diesel engine (referred to simply as engine hereinafter) E and associated systems such as an intake system including an air cleaner 2, an intake pipe 3 and an intake manifold 4, an exhaust system including an exhaust manifold 5 and an exhaust pipe 6, and a fuel system including a common rail 7 and an electronically controlled fuel injection valve 8. In the illustrated embodiment, an engine ECU (electronic control unit) for controlling the engine system 1 as a whole is provided in a passenger compartment, and an accelerator pedal 10 is provided in front of a driver's seat for a vehicle operator to actuate. The engine E is provided with a crankshaft sensor 11 for detecting the crankshaft angle thereof and a cylinder pressure sensor 12 for detecting the pressure in the cylinder. The accelerator pedal 10 is provided with an accelerator pedal sensor 13 for detecting the depressing stroke of the accelerator pedal 10.

Between the intake pipe 3 and exhaust pipe 6 is interposed a variable capacity turbocharger (variable geometry turbocharger; referred to as VG turbo hereinafter) 21 which compresses the air that is supplied to the intake manifold 4 during the operation of the engine E. An electronically controlled throttle valve 22 is provided in the intake pipe 3 to adjust the intake flow rate of the engine E in a prescribed operating range. Between the intake pipe 3 and intake manifold 4 is provided with a swirl control valve 23 for increasing the intake flow velocity by restricting the cross sectional area of the flow passage in a low rpm, low load operating condition. The intake pipe 3 is also provided with an intake flow rate sensor 24 for detecting a flow rate upstream of the VG turbo 21, and a boost pressure sensor 25 is provided downstream of the VG turbo 21 to detect the boost pressure. The throttle valve 22 is provided with a throttle valve opening sensor 26 for detecting the opening angle of the throttle valve 22.

The swirl control valve 23 is connected to the exhaust manifold 5 via an exhaust gas recirculation (EGR) passage 31 to conduct high temperature exhaust gas to the combustion chamber. The EGR passage 31 includes a cooler passage 31*a* and a bypass passage 31*b* that bifurcate from a switching valve 32 (provided at an exhaust end thereof), and an EGR valve 33 (provided at an intake end thereof) for adjusting the amount of the exhaust gas (EGR gas) that flows into the combustion chamber is provided at a point where the two passages 31*a* and 31*b* merge. The EGR valve 33 is provided with an EGR valve opening sensor 34 for detecting the opening angle of the EGR valve 33.

The exhaust pipe 6 is provided with an exhaust gas cleaning system 40 which includes a diesel oxidation catalytic converter (DOC) 41, a DPF 42 and a LNC 43 arranged in that order along the exhaust pipe 6 in the direction of the flow of the exhaust gas. The exhaust pipe 6 is provided with a first exhaust temperature sensor 44 for detecting the temperature of the upstream end of the DOC 41 and a second exhaust gas temperature sensor 45 for detecting the temperature of the upstream end of the DPF 42. The exhaust pipe 6 is provided with a pressure difference sensor 46 for detecting a pressure difference ΔP between the exhaust pressure upstream of the DPF 42 and the exhaust pressure downstream thereof.

The common rail 7 receives fuel which is drawn from a fuel tank 52, and is pressurized by a supply pump 51 actuated by the engine. The common rail 7 is provided with a rail pressure sensor 53 for detecting the internal pressure of the common rail (referred to as rail pressure hereinafter).

The engine E is connected to a manual transmission system 60 which is provided with a gear position sensor 61 for detecting the gear position of the transmission system and a vehicle speed sensor 62 for detecting the vehicle speed (rotational speed of the differential gear).

Figure 2:
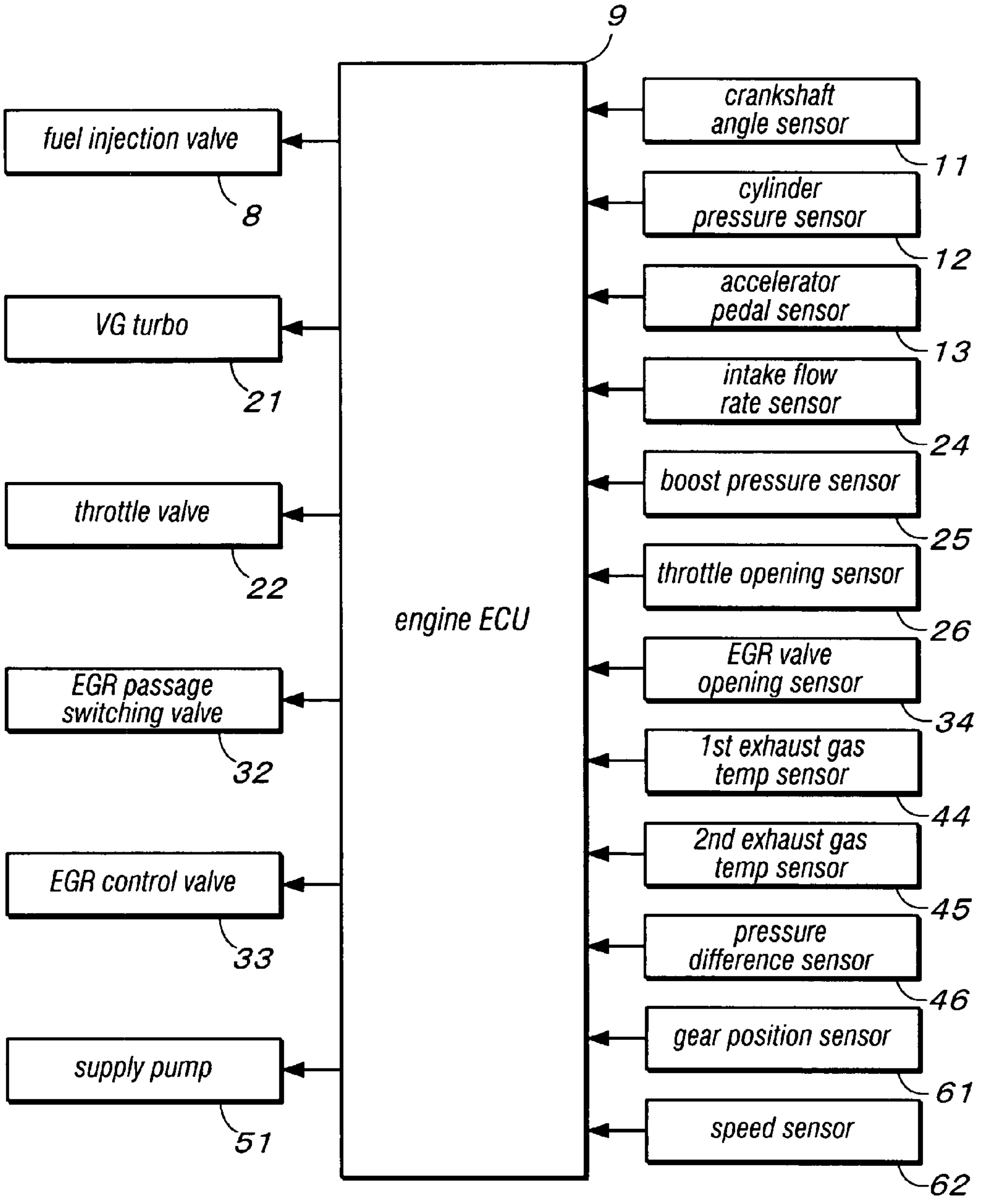
FIG. 2 is a block diagram showing various components of the engine system that are connected to the engine ECU.

The ECU 9 includes a microcomputer, ROM, RAM, peripheral circuit, I/O interface and various drivers. As illustrated in FIG. 2, the ECU receives detection signals from the various sensors (such as the crankshaft angle sensor 11 and cylinder pressure sensor 12) and an activations signal for the air conditioner (loading device) 63, and in turn provides drive signals for engine control devices (such as the fuel injection 8 and VG turbo 21). The loading devices include mechanical loading devices that are directly driven by the engine E and electric loading devices that apply an electric load via the alternator, and the air conditioner 63 includes both mechanical loading devices such as a cooler compressor and electric loading devices such as a blower fan.

<<Operation of the Embodiment>>

Figure 3:
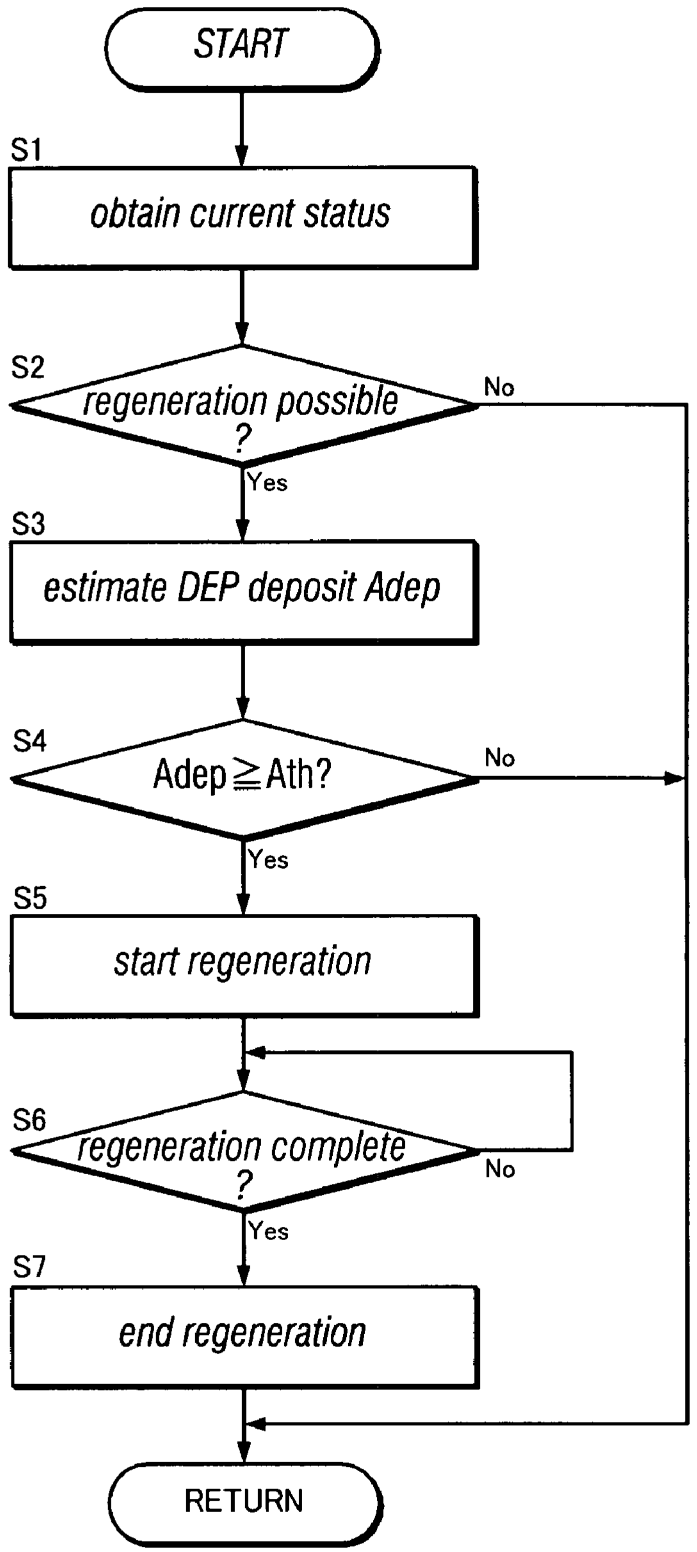
FIG. 3 is a control flowchart showing the regeneration control process.

Once the engine system 1 is activated, the ECU 9 repeats the regeneration control process according to the steps given in the flowchart of FIG. 3 at a prescribed operation interval (10 ms, for instance).

<<Regeneration Control>>

Once the regeneration control begins, the ECU 9 obtains the current operating status in step SI shown in FIG. 3. The modes of the operating status include a high load, high speed mode, a medium load, high speed mode and a low load, low speed mode, and can be determined from the engine load information, vehicle speed information, exhaust temperature information and so on that are obtained from the detection signals of the various sensors. The ECU 9 then determines if the current status is suitable for the regeneration of the DPF 42 in step S2, and if the determination result is No, the program flow returns to the start without executing any process.

If the current status is suitable for the regeneration of the DPF 42, the ECU 9 estimates the amount of the deposit Adep of DEP in the DPF 42 in step S3. Two estimation methods are executed concurrently for the estimation of the deposit Adep, and the greater value of the two obtained values is used as the estimated value.

The first estimation method is based on the use an instantaneous DEP emission map using the engine rpm and fuel supply as parameters. This map is based on the knowledge that the DEP increases with an increase in the engine rpm as well as with an increase in the supply of fuel. The ECU 9 estimates the deposition Adep of DEP in the DPF 42 by integrating the instantaneous DEP emission obtained from the instantaneous DEP emission map.

The second estimation method is based on the pressure difference ΔP between the exhaust pressure upstream of the DPF 42 and the exhaust pressure downstream thereof, and is based on the knowledge that the flow resistance of the DPF increases with the progress of DEP deposition. The ECU estimates the DEP deposition in the DPF 42 by dividing the pressure difference ΔP detected by the pressure difference sensor 46 with the exhaust flow rate Fex (ΔP/Fex). The exhaust flow rate Fex is estimated from the intake flow rate detected by the intake flow rate sensor 24, fuel injection from the fuel injection valve 8 and engine rpm.

The ECU 9 then determines in the DEP deposition Adep is greater than a threshold level Ath for starting the regeneration in step S4, and if this determination result is No, the program flow returns to the start without executing any subsequent process. The threshold level Ath for starting the regeneration is determined according to the operating status, and may be made smaller in a high load, high speed condition.

If the DEP deposition is greater than the threshold level Ath for starting the regeneration, and the determination result in step S4 is Yes, the ECU 9 starts a regeneration operation in step S5. In the regeneration operation, depending on the operating status obtained in step S1, a post injection by the fuel injection valve 8, an increase in the intake flow velocity and introduction of EGR gas using the EGR valve 33 are executed in a selective manner.

The ECU 9 determines in step S6 if the regeneration of the DPF 42 has been completed. If this determination result is Yes, a regenerating operation is conducted in step S7, and the program flow returns to the start. The regenerating operation is conducted for a prescribed time period depending on the operating status, and is concluded when the temperature of the DPF 42 stays above 600° C. for a prescribed time period or when the DEP deposition Adep has been reduced to zero.

<Regeneration Suspension Control>

Figure 4:
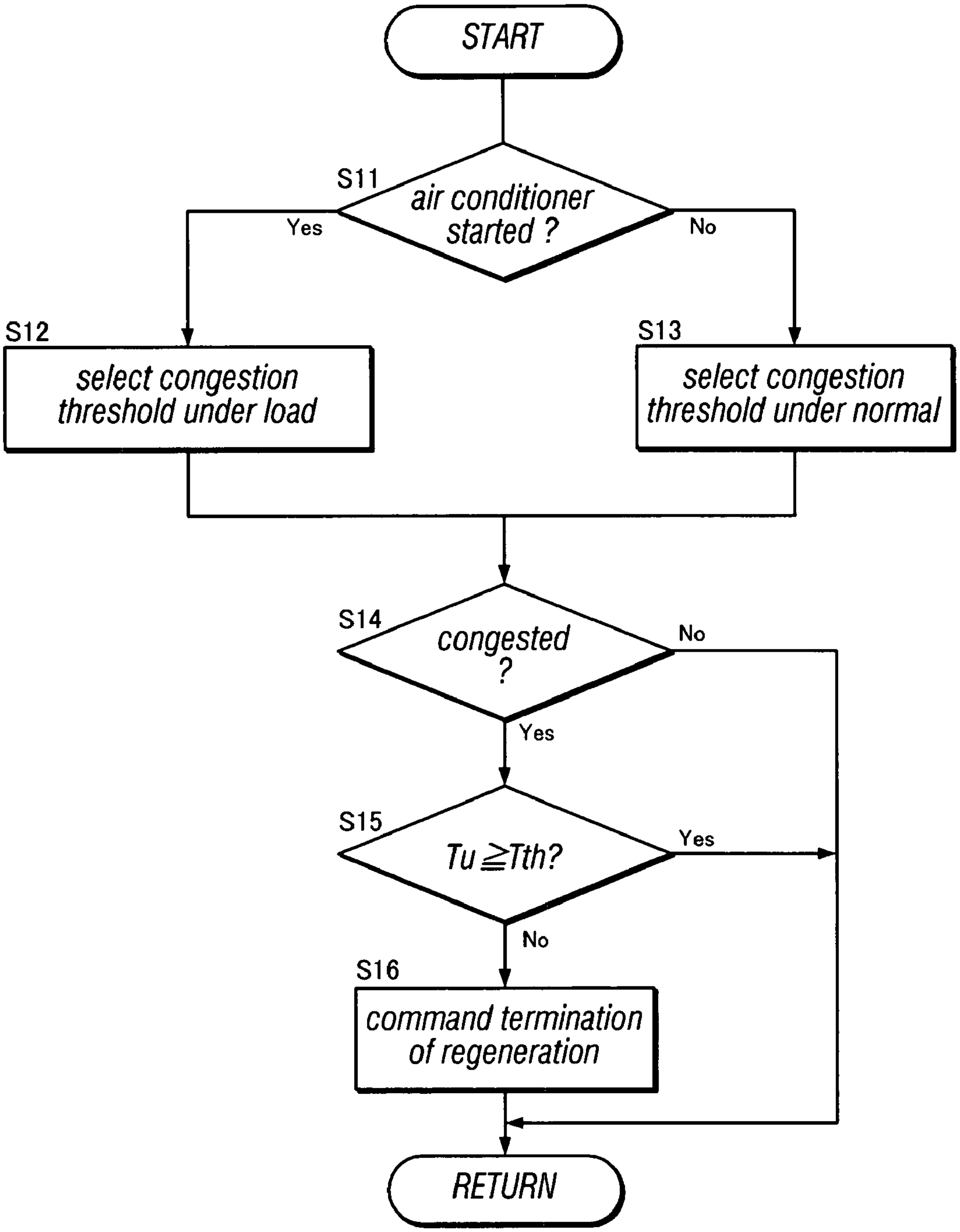
FIG. 4 is a control flowchart showing the regeneration suspension control process.

Once the regeneration control process is started, the ECU 9 repeats the execution of the regeneration suspension control process at a prescribed processing interval (10 ms, for instance) as shown in the flowchart of FIG. 4 concurrently with the regeneration control process.

Once the regeneration suspension control process is started, it is determined in step S11 of FIG. 4 if the air conditioner 63 is activated. If this determination result is No, the congestion determining threshold value for normal condition is selected in step S12. If this determination result is Yes, the congestion determining threshold value for loaded condition is selected in step S13.

The ECU 9 then determines if the vehicle is in a congested state in step S14, and if this determination result is No, the program flow returns to the start without executing any process. If the normal congestion determining threshold value was selected in step S12, the ECU 9 determines a congested state in step S14 if the gear position is the 3rd or lower and the vehicle speed is less than 60 km/h, or if the gear position is the 4th or higher and the vehicle speed is less than 50 km/h. If the loaded congestion determining threshold value was selected in step S13, the ECU 9 determines a congested state in step S14 if the gear position is the 3rd or lower and the vehicle speed is less than 40 km/h, or if the gear position is the 4th or higher and the vehicle speed is less than 30 km/h. The vehicle speed threshold value for determining a congested state is changed depending on the gear position because it is common for a vehicle operator to travel at a low gear position in a congestion.

If the vehicle is in a congested state and the determination result of step S14 is Yes, the ECU 9 determines in step S15 if the upstream temperature Tu of the DPF 42 is higher than a prescribed regeneration continue threshold value (450° C., for instance) Tth, and if this determination result is Yes, the program flow returns to the start without executing any process. A regeneration continue threshold value Tth is a tempeature above which the DPF 42 may be regenerated. The upstream temperature Tu of the DPF 42 is used because the upstream temperature is more directly affected by the changes in the exhaust temperature than the internal temperature of the DPF 42 and more accurately reflects the activity state of the DOC 41.

On the other hand, if the determination result of step 15 is No, the ECU 9 issues a regeneration suspend command in step S16 and suspends the regeneration operation. Thereby, the regeneration operation of the engine E is avoided if the temperature of the DPF 42 cannot be raised to the DEP combustion temperature even with a post injection so that unnecessary consumption of fuel can be avoided.

According to the illustrated embodiment, owing to the beneficial structure thereof, if a loading device such as an air conditioner 63 is activated and the exhaust temperature is thereby high, the regeneration operation is continued even when the vehicle speed is relatively low and the DPF 42 can be favorably regenerated.

This concludes the description of a preferred embodiment of the present invention, but the present invention is not limited by the illustrated embodiment. For instance, the embodiment was directed to a diesel engine, but the present invention is also applicable to other engines. The loading device in the foregoing embodiment consisted of an air conditioner, but may also consist of other mechanical loading devices such as a supercharger or electric loading devices such as radiator fans and lamps. The specific structure of the diesel engine and the specific control procedure can be freely modified without departing from the spirit of the present invention.

The contents of the original Japanese patent application on which the Paris Convention priority claim is made for the present application are incorporated in this application by reference.

The invention claimed is:

1. A control device for an internal combustion engine of a vehicle comprising a particulate filter installed in an exhaust passage of the engine and a loading device that applies a load to the engine, the control device being configured to execute a regeneration process for regenerating the particulate filter under a prescribed condition, the control device comprising:

a congestion detecting unit for detecting a congested state according to a traveling speed of the vehicle;

a load detector for detecting a load applied to the engine by a loading device; and a control unit for setting a congestion threshold value, the control unit suspending a regeneration process when a congested state is detected by the congestion detecting unit;

wherein the control unit lowers the congestion threshold value when a load is applied to the engine by the loading device.

2. The control device according to claim 1, wherein the loading device comprises an air conditioner.

3. The control device according to claim 1, wherein the congestion threshold value is given as a vehicle speed threshold.

4. The control device according to claim 1, wherein the vehicle speed threshold is varied depending on a shift position of a transmission system of the vehicle.

5. The control device according to claim 1, further comprising a temperature sensor for detecting a temperature of the particulate filter, the control unit continuing the regeneration process even when a congested state is detected if a detected temperature is higher than a prescribed value.

6. A control method for an internal combustion engine of a vehicle comprising a particulate filter installed in an exhaust passage of the engine, a loading device that applies a load to the engine and a control device for controlling the engine, the control device being configured to execute a regeneration process for regenerating the particulate filter under a prescribed condition, the control method comprising:

detecting a congested state according to a traveling speed of the vehicle;

detecting a load applied to the engine by a loading device;

setting a congestion threshold value;

suspending a regeneration process when a congested state is detected; and lowering the congestion threshold value when a load is applied to the engine by the loading device.

7. The control method according to claim 6, wherein the loading device comprises an air conditioner.

8. The control method according to claim 6, further comprising detecting a temperature of the particulate filter; and continuing the regeneration process even when a congested state is detected if a detected temperature is higher than a prescribed value.

9. The control method according to claim 6, wherein the congestion threshold value is given as a vehicle speed threshold.

10. The control method according to claim 9, wherein the vehicle speed threshold is varied depending on a shift position of a transmission system of the vehicle.

11. A non-transitory computer-readable medium having computer-executable instructions for performing a control method for an internal combustion engine of a vehicle comprising a particulate filter installed in an exhaust passage of the engine, a loading device that applies a load to the engine and a control device for controlling the engine, the control device being configured to execute a regeneration process for regenerating the particulate filter under a prescribed condition, the control method comprising:

detecting a congested state according to a traveling speed of the vehicle;

detecting a load applied to the engine by a loading device;

setting a congestion threshold value;

suspending a regeneration process when a congested state is detected; and lowering the congestion threshold value when a load is applied to the engine by the loading device.

12. The non-transitory computer-readable medium according to claim 11, wherein the loading device comprises an air conditioner.

13. The non-transitory computer-readable medium according to claim 11, wherein the control method further comprises detecting a temperature of the particulate filter; and continuing the regeneration process even when a congested state is detected if a detected temperature is higher than a prescribed value.

14. The non-transitory computer-readable medium according to claim 11, wherein the congestion threshold value is given as a vehicle speed threshold.

15. The non-transitory computer-readable medium according to claim 14, wherein the vehicle speed threshold is varied depending on a shift position of a transmission system of the vehicle.

* * * * *